Patented May 25, 1954

2,679,491

UNITED STATES PATENT OFFICE 2,679,491

WATERPROOFING OF CEMENT AND ALLIED COMPOSITIONS

Daniel W. Kennedy, Troy, and Frederick G. Weigand, Ballston Lake, N. Y., assignors to General Electric Company, a corporation of New York No Drawing. Application February 8, 1951, Serial No. 210,092

6 Claims. (Cl. 260—22)

This invention is concerned with the waterproofing of cement and other allied compositions, such as concrete, etc. More particularly, the invention relates to a cement waterproofing composition comprising by weight (1) from 50 to 95 per cent of an oil-modified alkyd resin and (2) from 5 to 50 per cent of an organo-polysiloxane resin cold-blendable and compatible with the alkyd resin.

One of the objects of this invention is to prepare a waterproofing composition for cement, concrete and similar allied materials so as to minimize the entrance and effects of water.

Another object of the invention is to reduce undesirably rapid water losses from concrete products containing certain amounts of water, especially during the stage when the concrete is first poured or formed.

Other objects of the invention will become more apparent from the following description of the invention.

Cement, concrete, and similar compositions are used extensively, especially in the building and highway arts. In the former case, cement or concrete blocks are used in building houses, and other architectural structures. It has often been desired to coat the outside of the concrete blocks so as to minimize the entrance of water from the atmosphere in order to preserve the concrete blocks and also in order to avoid undesirable dampness which might develop in the pores of the concrete blocks because of the entrance of water. This waterproofing is often desirable as undercoating for architectural paints and finishes. In road-building, when concrete is first poured it is in a rather fluid condition and contains a relatively large proportion of water. This water will evaporate in time to give the customary hard surface. In order to prevent too rapid an evaporation of water from the surface of the freshly poured concrete, various means have been employed to effect a slowdown of water evolution as, for example, by putting straw or cloth over the surface of the freshly poured concrete. The slower the evaporation of the water from the concrete surface, the more the concrete has a chance to knit and form a harder surface than is the case when the water evolves too fast.

Many coating compositions have been evolved for waterproofing cement and allied materials (for brevity, the word "cement" will be used to include cement, concrete, and similar compositions) but in general no one material has been completely satisfactory, although they have been able to cut down somewhat the entrance of water into concrete and to prevent excessive water evolution from freshly poured concrete. We have now discovered unexpectedly that a combination of specific non-interacted resins when applied in the form of a relatively dilute solution to concrete greatly improves the ability of the concrete to resist the entrance of water and also advantageously decreases the rate of evolution of water from concrete, e. g., from freshly poured or freshly formed concrete surfaces. More particularly, we have found that the combination of an oil-modified alkyd resin and a compatible and cold-blendable (i. e., in solution) organopolysiloxane resin in the form of a dilute solution is eminently suitable for the purposes described above. It was entirely unexpected and in no way could have been predicted that the combination of these two resins would be so useful for waterproofing cement since the individual resins by themselves were markedly inferior for that purpose to the combination of resins.

The organopolysiloxane resin which we have found to be outstanding for the above purpose is one more particularly described and claimed in the copending application of Welsh and Holdstock, Serial No. 210,094, filed concurrently herewith and assigned to the same assignee as the present invention, now U. S. Patent 2,661,348 issued December 1, 1953. This resin is prepared by hydrolyzing an organohalogenosilane or mixture of organohalogenosilanes with a hydrolysis medium comprising water and a halogenated organic liquid which is a solvent for the organohalogenosilane or mixture of organohalogenosilanes and the formed organopolysiloxane, the said solvent having a specific gravity above 1.1 (preferably above 1.2) and a boiling point below 175° C., and being inert to the formed hydrogen halide, to the aforesaid organohalogenosilane, and the formed organopolysiloxane. In one of the embodiments of the invention described and claimed by Welsh et al., the organohalogenosilane compositon is formed into a solution with the halogenated organic liquid and this solution is then added to the hydrolyzing water. The hydrolyzable organohalogenosilane or mixture of organohalogenosilanes may be any one of those well known in the art and may comprise, for example, methylchlorosilanes or phenylchlorosilanes or mixtures of phenylchlorosilanes and methylchlorosilanes (or phenyl methylchlorosilanes) in various ratios, preferably in a ratio wherein the total number of organic groups to silicon atoms ranges from about 1 to 2 and preferably within a narrower range of from about 1.2 to 1.8. The above-mentioned Welsh et al. application gives many examples of organohalogenosilane compositions which can be employed as well as various hydrolyzing media including various halogenated organic liquids which can be used as solvents for the organohalogenosilane and, of course, for the formed organopolysiloxane. In view of the more than adequate disclosures in the Welsh et al. application, which by reference is made part of the present application, no further description of the process therein disclosed and claimed will be given herein.

It is to be understood that other organopolysiloxanes cold-blendable and compatible with the oil-modified alkyd resin may also be employed without departing from the scope of the invention. Among such organopolysiloxanes resins which may be mentioned are, e. g., methyl, ethyl, propyl, butyl, phenyl, tolyl, cyclohexyl, benzyl, vinyl, allyl polysiloxanes, mixed organopolysiloxanes, for instance, methyl and phenyl, ethyl and phenyl, allyl and methyl, vinyl and methyl and phenyl, allyl and methyl and phenyl, etc., polysiloxanes in which the organic groups in the organopolysiloxanes are attached to the silicon atoms thereof by carbon-silicon linkages, and where both methyl and phenyl groups are in the polysiloxane molecule, the methyl and phenyl groups may be on the same or different silicon atoms.

The oil-modified alkyd resins which can be employed in the practice of the present invention include the resinous condensation products resulting from the reaction of one or more polyhydric alcohols with one or more polycarboxylic acids or anhydrides using as the oily modifying ingredient those normally employed in the preparation of oil-modified alkyd resins. Examples of polyhydric alcohols (dihydric, trihydric, etc.) which may be used in making the oil-modified alkyd resin are, for instance, ethylene glycol, diethylene glycol, propylene glycol, dipropylene glycol, glycerine, pentaerythritol, sorbitol, etc. Monohydric alcohols, e. g., those boiling above 150° C. such as the alkyl ethers of diethylene glycol, e. g., methyl ether of diethylene glycol, etc.; butyl ether of diethylene glycol, may also be used to modify the properties of the oil-modified alkyd resin.

Among the polycarboxylic acids which may be employed in making the oil-modified alkyd resin are, for example, the saturated aliphatic or aromatic polycarboxylic acids, especially the dicarboxylic acids, among which may be mentioned, for example, oxalic, malonic, succinic, adipic, tricarballylic, phthalic, isophthalic, terephthalic, diphenic, naphthalic, etc., acids (anhydrides may be used without departing from the scope of the invention). If desired, monocarboxylic acids, for example, benzoic acid, may also be used to modify the properties.

The modifying oily ingredients employed in making the oil-modified alkyd resins are preferably those selected from the class consisting of non-drying oils, semi-drying oils, drying oils, fatty oils, fatty oil acids, and mixtures thereof, all the foregoing being derived, for example, either from vegetable or animal sources or produced synthetically, etc. Among the modifying oils (in the raw, heated or blown state) which may be used are, for example, linseed oil, rapeseed, cottonseed, China-wood oil, castor oil (including raw castor oil), dehydrated castor oil, soya bean oil, oiticica oil, coconut oil fatty acids, fatty acid glycerides, etc. Additional examples of polyhydric alcohols, polycarboxylic acids, and oily modifying ingredients which may be employed are found in the Ham Patent 2,491,811 issued December 20, 1949, and assigned to the same assignee as the present invention. We prefer to use oil-modified glyceryl-phthalate resins which are well known in the art.

In making the waterproofing composition in usable form, it is desirable to dissolve the oil-modified alkyd resin and the organopolysiloxane resin in a suitable solvent for both these resins as, for example, xylene, toluene, benzene, mineral spirits, petroleum spirits, butanol, or mixtures of any one or more of these solvents which are satisfactory solvents for the resins. The type of solvent employed is not critical and any one of the many well known in the art may be used. Resin solids contents ranging from 1 to 10 per cent, by weight, of the total solution are advantageously employed.

In order to accelerate the conversion of both the oil-modified alkyd resin and the organopolysiloxane resin to the substantially infusible and insoluble state after application to the cement surface, small amounts of paint driers which have been known to be cure accelerators for both these resins are advantageously incorporated in the coating composition. In this connection attention is directed to Welsh Patent 2,449,572 issued September 21, 1948, and assigned to the same assignee as the present invention. This latter patent discloses a multitude of driers which have been found suitable for the purpose with respect to both the oil-modified alkyd resin and the organopolysiloxane resin. The amount of accelerator used may, of course, be varied within wide limits but generally we have found that the accelerator may comprise, for example, from about 0.01 to as high as 3 to 5 per cent, based on the total weight of the resin solids in the waterproofing composition. We have found that the naphthenates of lead, cobalt and calcium, and the octoates of zinc and other metals are especially suitable for the purpose.

It has been found that optimum results from the mixture of the organopolysiloxane resin and the oil-modified alkyd resin are realized when the organopolysiloxane resin comprises a certain per cent of the total mixture of the latter and the oil-modified alkyd resin. On a weight basis and considering only the resin solids content of the waterproofing agent, it has been found that small amounts of the organopolysiloxane resin as low as, for example, 5 per cent, by weight, of the mixture of resins, exercise a marked improvement in the waterproofing properties of the composition. In general, the organopolysiloxane resposition in should comprise from about 5 to 50 per cent, preferably from about 10 to 35 per cent of the total weight of the organopolysiloxane resin and the oil-modified alkyd resin. Amounts of organopolysiloxane resin in excess of 75 per cent cause a decrease in the effectiveness of the mixture of resins to adequately waterproof the cement.

It was also found that only organopolysiloxane resins compatible (i. e., those which when mixed with the oil-modified alkyd resin gave in solution a homogeneous mixture and when deposited as a cured film from which the solvent has been volatilized will have a clear appearance) with the oil-modified alkyd resins could be used in the practice of the invention and that incompatible but commonly soluble organopolysiloxane resins (that is, commonly soluble with the oil-modified alkyd resins) gave materially poorer waterproofing properties and characteristics as compared to the particular organopolysiloxane resin prepared by the method described and claimed in the aforementioned Welsh et al. patent.

Although the solids content of the waterproofing composition (that is, the solution of resins) may be varied within fairly wide limits, nevertheless we have found it eminently suitable that the solids content thereof range from about 1 to 25 per cent by weight, preferably from 2.5 to 10 per cent. This, of course, does not mean that higher concentrations of the resin solids may not be used for many purposes. However, in waterproofing cement and similar materials, it is often desirable to use spraying apparatus which, of necessity, requires a fairly dilute solution and it is for this reason that the dilute concentrations of the mixtures of resins mentioned above are eminently suitable.

In order that those skilled in the art may better understand how the present invention may be practiced, the following examples are given by way of illustration and not by way of limitation. All parts are by weight. The concrete slabs used in the tests disclosed in the following examples measured 6 x 12 x 1 inches. Each concrete slab was allowed to age at room temperature for two weeks. At the end of that time, the slabs with the exception of the control sample were sprayed with a 5 per cent solids solution of the resin or mixture of resins described below and then allowed to air-dry at room temperature for 48 hours. At the end of that time, they were completely immersed in water with the results shown below.

EXAMPLE 1

An organopolysiloxane resin was prepared in accordance with the method described and claimed in the aforementioned Welsh et al application as follows. A blend was prepared by mixing together 20 mol per cent methyltrichlorosilane, 40 mol per cent phenyltrichlorosilane, 20 mol per cent dimethyldichlorosilane, and 20 mol per cent diphenyldichlorosilane. 500 grams of this blend was mixed with 750 grams of trichloroethylene to form a homogeneous solution and this solution was then added to a well-stirred mass of 2000 grams of water at 35° C. The solvent-silane blend was added slowly through an inlet tube which dipped well below the surface of the water. Total addition time was 22 minutes during which time the temperature of the hydrolysis mixture rose to 72° C. Stirring was continued for another 5 minutes and thereafter the mixture was allowed to separate. The lower trichloroethylene layer of the resin was separated and stripped of most of the solvent by heating to a pot temperature of 150° C. At this point 130 grams of xylene was added to the resin and the resulting solution was heated to gentle reflux for 1 hour. After filtering, the solution was adjusted to 60 per cent resin solids by adding the required amount of xylene.

A spraying solution was then prepared by mixing together 48 parts of a linseed oil fatty acid modified glyceryl-phthalate alkyd resin in a petroleum spirits solvent (50 per cent solids), 10 parts of the above prepared organopolysiloxane solution, 0.15 part cobalt naphthenate, 0.75 part calcium naphthenate, 271 parts mineral spirits, and 271 parts xylene. The total resin solids comprised approximately 5 per cent, by weight, of the total weight of the solution. Concrete slabs were then sprayed with this solution of resins and allowed to air-dry as described above, and thereafter immersed in water for varying lengths of time during which the amount of water absorbed by the concrete slab was measured at regular intervals. Additional test slabs were prepared whereby the latter were coated with dilute solutions of the above prepared organopolysiloxane resin alone (containing a cure accelerator) and the above described oil-modified alkyd resin (containing a drier specifically a mixture of metal naphthenates). The following table shows the per cent gain of water over the original weight of the concrete slab.

Table 1

| Resin | Percent Gain 8 Hours | Percent Gain 24 Hours | Percent Gain 48 Hours |
|---|---|---|---|
| None—Control | 7.57 | 7.6 | 7.6 |
| Oil-modified alkyd alone | 6.35 | 8.56 | 8.77 |
| Organopolysiloxane resin alone | 6.3 | 9.2 | 9.35 |
| Alkyd-organopolysiloxane combination | 1.95 | 3.73 | 4.93 |

The foregoing table illustrates clearly the unexpected and unpredictable result that the combination of the organopolysiloxane resin and the oil-modified alkyd resin is materially better than each of the resins individually when employed for waterproofing cement.

EXAMPLE 2

In this example the oil-modified alkyd resin and organopolysiloxane resin described in Example 1 were mixed together in varying proportions and each mixture was then applied by spraying to the same size concrete panels described in Example 1. The sprayed panels were then air-dried 48 hours at room temperature and immersed in water with the results shown below. Table 2 describes the proportions of oil-modified alkyd resin and organo-polysiloxane resin. Table 3 discloses the results of the immersion tests in which the sprayed concrete panels were immersed in water for the time designated in Table 3.

Table 2

| Sample No.[1] | Percent by Weight Oil-Modified Alkyd Resin | Percent by Weight Organopolysiloxane Resin |
|---|---|---|
| A | 95 | 5 |
| B | 90 | 10 |
| C | 70 | 30 |
| D | 50 | 50 |

[1] The percents, by weight, are on a solids basis and each resin mixture was in the form of a 5 percent solution containing the same solvents and driers used in Example 1.

Table 3

| Sample No. | Percent Weight Increase | | |
|---|---|---|---|
| | 2 Hours | 4 Hours | 6 Hours |
| Control (No coating) | 9.8 | 9.8 | 9.8 |
| A | 6.1 | 7.6 | 8.2 |
| B | 6.1 | 7.5 | 7.9 |
| C | 4.7 | 6.0 | 6.6 |
| D | 3.6 | 4.9 | 5.5 |

EXAMPLE 3

This example illustrates the ability of the organo-polysiloxane-alkyd resin combination to seal in water in concrete so that the evolution of the water or moisture contained therein is appreciably slowed down. In conducting the tests, the respective panels were coated with the stipulated coating compositions (with the exception of the control sample) by spraying, as was done in Examples 1 and 2, and the panels allowed to age at room temperature so that the coating was properly fixed or cured on the concrete panels. Thereafter, the panels were immersed in water for three weeks at which time it was considered that they had absorbed a maximum amount of water. The panels were removed from water and allowed to dry at room temperature while weights of the panels were taken at intervals. The per cent figures in Table 4 below indicate the amount of water still remaining in the panels. The resins used comprised the same three employed in Example 1.

Table 4

| Resin [1] | Percent Gain 3 Weeks | Percent Moisture Remaining | | | |
|---|---|---|---|---|---|
| | | 2 Hours | 1 Day | 4 Days | 1 Week |
| Control (no previous resin treatment) | 4.7 | 4.1 | 2.6 | 0.3 | 0 |
| Organopolysiloxane resin alone | 5.9 | 5.4 | 3.8 | 1.3 | 0 |
| Oil-modified alkyd resin alone | 7.1 | 6.5 | 4.6 | 2.0 | 0.8 |
| Alkyd-organopolysiloxane combination | 6.5 | 6.0 | 4.6 | 2.4 | 1.2 |

[1] Each resin solution comprised a 5 percent solids concentration.

The results above indicate clearly that not only can our claimed compositions be used effectively to minimize the moisture absorption of concrete but also they can be applied to concrete surfaces for the purpose of decreasing the rate of volatilization of the moisture contained therein and thereby give improved concrete surfaces and improved concrete products.

EXAMPLE 4

This example shows the effect of treating stucco panels with our claimed composition and therafter applying thereto two coats of paint after which the panels were placed on exposure to the elements as, e. g., sun, rain, sleet, etc., for two months and thereafter the panels were removed and the water absorption tests started using the same tests as described in Example 1. The organopolysiloxane resin solution and the organopolysiloxane-oil-modified alkyd resin solution combination used in this example are identical with those described above in Example 1. In each case after application of the under waterproofing coating, the successive two top coats were applied one on top of the other, permitting the first top coat to dry before the second coat was applied. In one case a regular outside white oil-base paint comprising titanium dioxide in a linseed oil base was used as one pair of top coats, while in another case, a rubber-base cement comprising chlorinated rubber in combination with linseed oil was used as the other pair of top coatings. The following Table 5 shows the results of these water-immersion tests after the respective panels were subjected to the tests described above.

Table 5

| Resin Top Coat | Per Cent Gain in Moisture | | | |
|---|---|---|---|---|
| | 8 Hours | 2 Days | 4 Days | 1 Week |
| Oil-base Paint: | | | | |
| Control [1] | 0.6 | 1.4 | 1.7 | 2.3 |
| Organopolysiloxane Undercoat | 0.4 | 1.2 | 1.4 | 2.0 |
| Alkyd resin undercoat | 0.4 | 1.3 | 1.7 | 2.1 |
| Organopolysiloxane-alkyd underocat | 0.1 | 0.7 | 0.9 | 1.3 |
| Rubber-base Paint: | | | | |
| Control [1] | 1.1 | 2.6 | 3.1 | 3.5 |
| Organopolysiloxane undercoat | 1.1 | 2.5 | 3.2 | 3.6 |
| Alkyd resin undercoat | 0.2 | 1.0 | 1.4 | 1.7 |
| Organopolysiloxane-alkyd undercoat | 0.3 | 0.8 | 1.0 | 1.4 |

[1] No waterproofing beneath top coats.

It was noticed that when the mixture of the organopolysiloxane resin and the oil-modified alkyd resin was used as a waterproofing agent on stucco, either with or without the top coats of paints, checking of the stucco surface was either greatly reduced or completely eliminated. This is an unusual property since the undercoats of the alkyd resin alone or the organopolysiloxane resin alone either had very little effect on or failed completely in the elimination of checking. The stucco samples which contained no undercoating at all were badly checked.

It will, of course, be apparent to those skilled in the art that other organopolysiloxanes prepared in accordance with the descriptions outlined in the aforementioned Welsh and Holdstock application, many examples of which are given in the latter application, as well as many other types of oil-modified alkyd resins previously described may be employed in place of the ones used in the foregoing examples. In addition, the proportion of ingredients may be varied within the more desirable limits mentioned above, and other drying or curing agents may be employed in place of the naphthanates or octoates mentioned in the preceding examples. Various types of solvents can be substituted for those used above but caution should be exercised in that the choice of solvents does not result in throwing out one of the two resinous components comprising the waterproofing material.

As will be apparent from the preceding description of the invention, our compositions of matter are eminently suitable for protecting various concrete surfaces and improving their water-resistance. In addition, our claimed compositions of matter may also be used in applications requiring a minimum of loss of water from freshly constructed concrete surfaces in order to permit the concrete to harden at a more desirable rate which in many respects is controlled by the rate of water evolved from the concrete surface.

What we claim as new and desire to secure by Letters Patent of the United States is:

1. A cement waterproofing composition comprising a 1 to 10 per cent solids organic solution of a compatible, cold-blendable mixture of non-interacted ingredients comprising (1) an organopolysiloxane resin in which the organic groups are selected from the class consisting of methyl, ethyl, phenyl radicals, and mixtures of such radicals attached to silicon by carbon-silicon linkages and obtained by hydrolyzing an organochlorosilane designed to give the above-mentioned organopolysiloxane with a mixture of ingredients consisting essentially of (a) water and (b) a liquid chlorinated hydrocarbon which is a solvent for both the organochlorosilane and the formed organopolysiloxane, said solvent having a specific gravity above 1.1 and a boiling point below 175° C. and being inert to any formed hydrogen chloride, to the aforesaid organochlorosilane and to the organopolysiloxane, and (2) an oil-modified alkyd resin, the said organopolysiloxane resin comprising, by weight, from 10 to 50 per cent of the total weight of the latter and the oil-modified alkyd resin.

2. A cement waterproofing composition comprising a 1 to 10 per cent solids organic solution of a compatible, cold-blendable mixture of non-interacted ingredients comprising (1) a methyl phenyl polysiloxane resin obtained by hydrolyzing a mixture of organochlorosilanes comprising a methylchlorosilane and a phenylchlorosilane with a mixture of ingredients consisting essentially of (a) water and (b) a liquid chlorinated hydrocarbon which is a solvent for both the organochlorosilane and the formed organopolysiloxane, said solvent having a specific gravity above 1.1 and a boiling point below 175° C. and being inert to any formed hydrogen chloride, to the aforesaid organochlorosilane and to the organopolysiloxane, and (2) an oil-modified alkyd resin, the aforesaid methyl phenylpolysiloxane comprising from 10 to 50 per cent of the total weight of the latter and the oil-modified alkyd resin.

3. A cement waterproofing composition comprising a 1 to 10 per cent solids organic solution of a compatible, cold-blendable mixture of non-interacted ingredients comprising (1) a methylpolysiloxane obtained by hydrolyzing a mixture of methylchlorosilanes comprising methyltrichlorosilane and dimethyldichlorosilane with a mixture of ingredients consisting essentially of (a) water and (b) a liquid chlorinated hydrocarbon which is a solvent for both the methylchlorosilanes and the formed methylpolysiloxane, said solvent having a specific gravity above 1.1 and a boiling point below 175° C., and being inert to any formed hydrogen chloride, to the aforesaid methylchlorosilanes and to the methylpolysiloxane, and (2) an oil-modified alkyd resin, the said methylpolysiloxane resin comprising, by weight, from 10 to 50 per cent of the total weight of the latter and the oil-modified alkyd resin.

4. A waterproofing composition for cement comprising a 1 to 10 per cent solids organic solution of a compatible, cold-blendable mixture of non-interacted ingredients comprising (1) a methyl phenylpolysiloxane resin obtained by hydrolyzing a mixture of organochlorosilanes comprising methyltrichlorosilane, phenyltrichlorosilane, and dimethyldichlorosilane with a mixture of ingredients consisting essentially of (a) water and (b) trichloroethylene and (2) a linseed oil-modified glyceryl-phthalate alkyd resin, the aforesaid methyl phenylpolysiloxane comprising from 10 to 50 per cent of the total weight of the latter and the oil-modified alkyd resin.

5. A cement waterproofing composition comprising a 1 to 10 per cent solids organic solution of a compatible, cold-blendable mixture of non-interacted ingredients comprising (1) a methyl phenylpolysiloxane resin obtained by hydrolyzing a mixture of methylchlorosilanes comprising methyltrichlorosilane and dimethyldichlorosilane in a hydrolysis medium consisting essentially of (a) water and (b) a liquid chlorinated hydrocarbon which is a solvent for both the organochlorosilanes and formed methyl phenylpolysiloxane, said solvent having a specific gravity above 1.1 and a boiling point below 175° C. and being inert to any formed hydrogen chloride, to the aforesaid organochlorosilanes, and to the formed methylpolysiloxane, and (2) an oil-modified alkyd resin comprising a linseed oil-modified glyceryl-phthalate alkyd resin, the said methylpolysiloxane comprising, by weight, from 10 to 50 per cent of the total weight of the latter and the oil-modified glyceryl-phthalate alkyd resin.

6. A cement waterproofing composition comprising a 1 to 10 per cent solids organic solution of a compatible, cold-blendable mixture of non-interacted ingredients comprising (1) an organopolysiloxane resin in which the organic groups are selected from the class consisting of methyl, ethyl, phenyl radicals, and mixtures of such radicals attached to silicon by carbon-silicon linkages and obtained by hydrolyzing a mixture of organochlorosilanes designed to give the abovementioned organopolysiloxane in a hydrolysis medium consisting essentially of (a) water and (b) trichloroethylene, and (2) a linseed oil-modified glyceryl-phthalate alkyd resin, the organopolysiloxane resin comprising, by weight, from 10 to 50 per cent of the total weight of the latter and the oil-modified alkyd resin.

References Cited in the file of this patent

UNITED STATES PATENTS

| Number | Name | Date |
|---|---|---|
| 2,258,222 | Rochow | Oct. 7, 1941 |
| 2,495,306 | Zurcher | Jan. 24, 1950 |
| 2,587,295 | Doyle et al. | Feb. 26, 1952 |
| 2,622,072 | Gordon | Dec. 16, 1952 |

FOREIGN PATENTS

| Number | Country | Date |
|---|---|---|
| 164,534 | Austria | Nov. 25, 1949 |
| 583,754 | Great Britain | Dec. 30, 1946 |

OTHER REFERENCES

Paint, Oil & Chemical Review, Nov. 11, 1948, pages 49–51.